United States Patent [19]
Woo

[11] Patent Number: 5,770,931
[45] Date of Patent: Jun. 23, 1998

[54] CIRCUIT FOR GENERATING A HOLD VOLTAGE OF A MONITOR

[75] Inventor: Sang-Yean Woo, Kyeonggi-Do, Rep. of Korea

[73] Assignee: Daewoo Electronics Co., Ltd., Seoul, Rep. of Korea

[21] Appl. No.: 579,198

[22] Filed: Dec. 27, 1995

[30]     Foreign Application Priority Data

Dec. 27, 1994  [KR]   Rep. of Korea .................. 94-37150

[51] Int. Cl.⁶ ............................................ H01J 29/70
[52] U.S. Cl. .......................................................... 315/408
[58] Field of Search ............................ 345/211, 213; 348/510, 536, 555; 315/387, 403, 408; 327/363; 330/85, 86, 99, 252, 260, 278, 300; 331/146, 149, 172, 173, 179

[56]            References Cited

U.S. PATENT DOCUMENTS

| | | | |
|---|---|---|---|
| 2,468,420 | 4/1949 | Wendt | 331/146 |
| 2,509,761 | 5/1950 | Crooker | 331/146 |
| 2,832,886 | 4/1958 | Morrill | 327/363 |
| 3,456,075 | 7/1969 | Knight | 348/536 |
| 3,629,720 | 12/1971 | Sedra | 330/86 |
| 5,023,523 | 6/1991 | Tomita | 315/364 |
| 5,124,792 | 6/1992 | Shimaoka | 348/555 |
| 5,138,240 | 8/1992 | Shimura | 315/408 |

*Primary Examiner*—Mark R. Powell
*Attorney, Agent, or Firm*—Beveridge, DeGrandi Weilacher & Young LLP

[57]            ABSTRACT

A monitor generating a stable hold voltage includes a microprocessor for producing a mode line signal, a mode setting signal and an output voltage in accordance with an externally-supplied horizontal sync signal and vertical sync signal, a hold voltage generating section for generating a hold voltage by varying an output voltage of said microprocessor, and a horizontal deflection circuit for generating a horizontal drive signal of spherical wave having a frequency determined according to the hold voltage of the hold voltage generating section and generating a horizontal deflection signal of triangular waveform according to the horizontal drive signal to supply it to a cathode ray tube. Thus, the number of input port of the hold voltage generating section is reduced while preventing a malfunction thereof caused by unstable mode signals.

4 Claims, 4 Drawing Sheets

CIRCUIT FOR GENERATING A HOLD VOLTAGE OF A MONITOR

BACKGROUND OF THE INVENTION

1. Field of the Invention

The present invention relates to a circuit for generating a hold voltage, and more particularly to a hold voltage generating circuit for generating a stable hold voltage in accordance with a frequency of a horizontal sync signal supplied to a monitor.

2. Description of the Prior Art

Generally, in a monitor, a hold voltage is generated in accordance with a frequency of an externally-provided horizontal sync signal. A frequency is determined in accordance with the hold voltage, and a horizontal drive pulse of spherical wave having the frequency is generated. Then, a horizontal deflection signal of triangular waveform is generated in accordance with the horizontal drive pulse. The horizontal deflection signal deflects beams radiated from an electron gun to a mask of a cathode ray tube in the horizontal direction.

The above-stated process will be described in detail with reference to FIG. 1. As illustrated in FIG. 1, a horizontal sync signal Hs and a vertical sync signal Vs are externally supplied to a microprocessor 1 which converts horizontal sync signal Hs into a voltage Fv and sets a mode in accordance with the voltage to provide mode signals CS1 and CS2 together with voltage Fv. At this time, mode signals CS1 and CS2 are produced both in a high potential state, e.g., of approximately 5 V, by setting as a Video Graphic Adapter (VGA) when a frequency band of horizontal sync signal Hs is 31 KHz, or in a low potential state, e.g., of approximately 0 V, and the high potential state, respectively, by setting as a super-VGA (Super VGA) in case of 37 KHz. When the frequency of horizontal sync signal Hs is 48 KHz, it is set as an extended-VGA (X-VGA) to be produced both in the low potential state.

Meantime, microprocessor 1 sets a line mode in accordance with polarities of horizontal sync signal Hs and vertical sync signal Vs to produce a line mode signal OUT1. For example, if both polarities of horizontal sync signal Hs and vertical sync signal Vs are positive (+) while have the VGA mode, line mode signal OUT1 is set by 350 line mode. Whereas, when the polarities of horizontal sync signal Hs and vertical sync signal Vs are negative (−) and positive (+), respectively, line mode signal OUT1 is set by 400 line mode. Thereafter, in accordance with line mode signal OUT1, a scan line of the monitor is determined.

In addition, microprocessor 1 generates a mode setting signal OUT2 in accordance with the existence of horizontal sync signal Hs and vertical sync signal Vs. Mode setting signal OUT2 sets an on-mode when both horizontal sync signal Hs and vertical sync signal Vs are received, and a suspend mode when horizontal sync signal Hs is received while vertical sync signal Vs is not received. When horizontal sync signal Hs is not received but vertical sync signal Vs is received, a stand-by mode is set, and an off-mode is set when neither horizontal sync signal Hs nor vertical sync signal Vs is received.

On the other hand, microprocessor 1 produces a bright signal Br, a contrast signal C, a gain signal G and bias signal Bi to a video processor 2 apart from the frequency of horizontal sync signal Hs. Here, bright signal Br denotes a signal for indicating overall brightness of a screen; contrast signal C is a signal for indicating the brightness of externally-received video signals R,G,B; gain signal G is a signal for determining an amplifying range of video signals R,G,B; and bias signal Bi is a signal for adjusting the bias of video signals R,G,B.

In video processor 2, video signals R,G,B are amplified in accordance with bright signal Br, contrast signal C, gain signal G and bias signal Bi. An output signal OUT3 of video processor 2 is supplied to an electron gun (not shown) of a cathode ray tube CRT, and the electron gun scans output signal OUT3 onto a mask of cathode ray tube CRT in the shape of beams.

A hold voltage generating section 3 is connected to first output side port to third output side port of microprocessor 1. Mode signals CS1 and CS2 and output voltage Fv of microprocessor 1 is supplied to hold voltage generating section 3 which varies output voltage Fv in accordance with mode signals CS1 and CS2 to provide a hold voltage $V_H$. In accordance with hold voltage $V_H$, a horizontal drive signal is generated, and then a horizontal deflection signal is generated in accordance with the generated horizontal drive signal.

A power source section 4 is connected to a fourth output side port of microprocessor 1. Mode setting signal OUT2 of microprocessor 1 is supplied to power source section 4 which converts an input AC power supply AC to a DC power supply B+, and DC power supply B+ is provided in accordance with mode setting signal OUT2 of microprocessor 1.

A horizontal deflection circuit 5 is connected to the output side of hold voltage generating section 3 and the output side of power source section 4. Horizontal deflection circuit 5 is supplied with hold voltage $V_H$ of hold voltage generating section 3, horizontal sync signal Hs and DC power supply B+ of power source section 4. Horizontal deflection circuit 5 generates a horizontal drive pulse HDP of a spherical wave and a flyback pulse FBP in accordance with hold voltage $V_H$, in which horizontal drive pulse HDP is converted into a horizontal deflection signal OUT4 of sawtooth wave. Horizontal deflection circuit 5 supplies horizontal deflection signal OUT4 to a horizontal deflection coil HDY of cathode ray tube CRT in accordance with the input of DC power supply B+. By this operation, the output signal of video processor 2 is deflected in the horizontal direction.

A high voltage generating section 6 is connected to the output side port of horizontal deflection circuit 5. High voltage generating section 6 is supplied with flyback pulse FBP of horizontal deflection circuit 5. High voltage generating section 6 produces a high voltage HV, a focus signal FOCUS and a screen signal SCREEN. High voltage HV, focus signal F and screen signal S are respectively provided to grid ports G1, G2 and G3 of cathode ray tube CRT.

High voltage HV concentrates the beam on cathode ray tube CRT, focus signal F focuses the beam on cathode ray tube CRT, and screen signal S adjusts the quantity of the beam which focuses on cathode ray tube CRT.

A vertical deflection circuit 7 is connected to a fifth output side port of microprocessor 1. Vertical deflection circuit 7 is supplied with externally-provided vertical sync signal Vs and line mode signal OUT1 of microprocessor 1. Vertical deflection circuit 7 synchronizes the frequency of vertical sync signal Vs with line mode signal OUT1 to generate a vertical deflection signal OUT5 which is supplied to a vertical deflection coil VDY of cathode ray tube CRT.

FIG. 2 is a detailed circuit diagram showing a construction of hold voltage generating section 3 of FIG. 1. As stated above, output voltage Fv and mode signals CS1 and CS2 of microprocessor 1 is provided to hold voltage generating section 3.

In more detail, an amplifying part 31 of hold voltage generating section 3 is connected to the output side of microprocessor 1. Output voltage Fv of microprocessor 1 is supplied to a positive (+) port of an amplifier OP31 of amplifying part 31. Amplifier OP31 amplifies output voltage FV.

The output of amplifier OP31 is connected to the input of a resistor R31, and the output sides of resistors R31 and R32 are grounded. The output side of resistor R31 is also connected to the negative (−) port of amplifier OP31. The output voltage of amplifier OP31 is divided by resistors R31 and R32, and the output signals of resistors R31 and R32 are provided to negative (−) port of amplifier OP31. Thus, an amplifying ratio of amplifier OP31 is determined by the dividing value of resistors R31 and R32. More specifically, $$Vo = \left(1 + \frac{R31}{R32}\right) * Fv \text{ where output voltage } Vo \text{ is}$$

the output voltage of amplifier OP31.

Meanwhile, mode signals CS1 and CS2 of microprocessor 1 are supplied to a voltage modifying section 32 which varies output voltage Vo of amplifying part 31.

First, the output side of microprocessor 1 is connected with a resistor R33 of voltage modifying section 32. The output side of resistor R33 is connected with the base of a transistor Q31, and the emitter side of transistor Q31 is grounded. Mode signal CS1 is supplied to the base side of transistor Q31 via resistor R33, and transistor Q31 is switched by mode signal CS1.

On the other hand, the output side of microprocessor 1 is connected to a resistor R34 of voltage modifying section 32, and the output side of resistor R34 is connected to the base side of a transistor Q32. The emitter side of transistor Q32 is grounded. An externally-provided power source Vcc is supplied to the collector side of transistor Q32 via a resistor R35. Mode signal CS2 is supplied to the base side of transistor Q32 via resistor R34, and transistor Q32 is switched by mode signal CS2.

The output side of resistor R35 is connected to the input side of a resistor R36. The output side of resistor R36 is connected to the base side of a transistor Q33. The collector side of transistor Q33 is connected to the output side of amplifying part 31, and the output side of amplifying part 31 is connected to the input side of a resistor R39. Also, the emitter side of transistor Q33 is connected to the input side of a resistor R37. The output side of resistor R37 is connected to the input side of a resistor R38 while being connected to the input side of a resistor R39. When transistor Q32 is switched in the turn-off state, power source Vcc is supplied to the input side of resistor R36 via resistor R35. By this connection, transistor Q33 is switched in the turn-off state.

Transistors Q31, Q32 and Q33 are switched in the turn-on or turn-off state in accordance with mode signals CS1 and CS2 of microprocessor 1. By this operation, hold voltage $V_H$ is determined by the ratio of resistors R37, R38 and R39.

A case that the frequency of horizontal sync signal Hs is 48 KHz, i.e., both mode signals CS1 and CS2 are in the low potential state, will be given as an example. Mode signals CS1 and CS2 are respectively supplied to transistors Q31 and Q32 via resistors R33 and R34. By this supply, transistors Q31 and Q32 are switched in the turn-off state. At this time, transistor Q33 is switched in the turn-on state. Therefore, an output current i of voltage modifying section 32 is in proportion to a parallel value of resistors R37 and R39 and its output current i is in proportion to hold voltage $V_H$. That is, $$i \propto \frac{R37 + R39}{R37 * R39}.$$

Meanwhile, if the frequency of horizontal sync signal Hs is 37 KHz, i.e., if mode signals CS1 and CS2 are respectively supplied in the low potential state and high potential state, mode signals CS1 and CS2 are supplied to transistors Q31 and Q32 via resistors R33 and R34 to switch transistor Q31 in the turn-off state while switching transistor Q32 in the turn-on state. Accordingly, transistor Q33 is switched in the turn-off state. At this time, output current i of voltage modifying section 32 is in inverse proportion to resistor R39, and its output current i is in proportion to hold voltage $V_H$. That is, $$i \propto \frac{1}{R39}.$$

Also, when the frequency of horizontal sync signal Hs is 31 KHz, i.e., when both mode signals CS1 and CS2 are supplied in the high potential state, transistors Q31 and Q32 are switched in the turn-on state. By this operation, transistor Q33 is switched in the turn-off state. Therefore, output current i of voltage modifying section 32 is in proportion to a division value of resistors R38 and R39, and its output current i is in proportion to hold voltage $V_H$. That is, $$i \propto \frac{R38}{R38 + R39}.$$

Thereafter, the output side of voltage modifying section 32 is connected to a shaping section 33. Hold voltage $V_H$ of voltage modifying section 32 is supplied to shaping section 33 to thus smooth hold voltage $V_H$. Hold voltage $V_H$ of shaping section 33 is supplied to horizontal deflection circuit 5.

Hold voltage generating section 3 of the conventional monitor requires the plurality of input ports for receiving mode signals CS1, CS2 and output voltage Fv from microprocessor 1, and instability of mode signals CS1 and CS2 supplied via the plurality of input ports causes a malfunction of hold voltage generating section 3 to produce unstable hold voltage with a consequence of lowering reliability of a product perceived by a user.

SUMMARY OF THE INVENTION

It is an object of the present invention to provide a circuit for generating a hold voltage in a monitor capable of minimizing the number of input ports of a hold voltage generating section by producing the hold voltage only by an output voltage of a microprocessor.

It is another object of the present invention to provide a circuit for generating a hold voltage in a monitor capable of preventing a malfunction of a hold voltage generating section caused by instability of an output voltage by producing the hold voltage only by an output voltage of a microprocessor.

It is still another object of the present invention to provide a circuit for generating a hold voltage in a monitor capable of economizing designing cost and time by simplifying the construction of a hold voltage generating section.

To achieve the above object of the present invention, a circuit for generating a hold voltage of a monitor includes a microprocessor for producing a mode line signal, a mode setting signal and an output voltage in accordance with a vertical sync signal and a horizontal sync signal, and a power source section for generating a DC power by using a mode set signal and an AC power supply of the microprocessor as an input. A hold voltage is produced from a hold voltage generating section by varying the output voltage of the microprocessor, and a horizontal deflection circuit determines a frequency in accordance with the hold voltage of the hold voltage generating section and horizontal sync signal, generates a horizontal drive signal of spherical wave having the determined frequency and a flyback pulse, generates a horizontal deflection signal of triangular waveform in accordance with the horizontal drive signal and supplies the horizontal deflection signal to a horizontal deflection coil in accordance with the DC power supply.

In the preferred embodiment of the present invention, the hold voltage is generated from the hold voltage generating section by varying the output voltage of the microprocessor, and the hold voltage and externally-provided horizontal sync signal are supplied to the horizontal deflection circuit to generate the horizontal drive signal of spherical wave. The horizontal drive signal is converted into the horizontal deflection signal of triangular waveform. The horizontal deflection signal is provided to the horizontal deflection coil in accordance with the DC power supply of the power source section. Therefore, the hold voltage is determined by the output voltage to reduce the number of input ports in the hold voltage generating section, and prevent the malfunction of the hold voltage generating section caused by the instability of the mode signals, thereby enhancing reliability of a product.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

A circuit for generating a hold voltage of a monitor according to the present invention will be described in detail.

Figure 3:
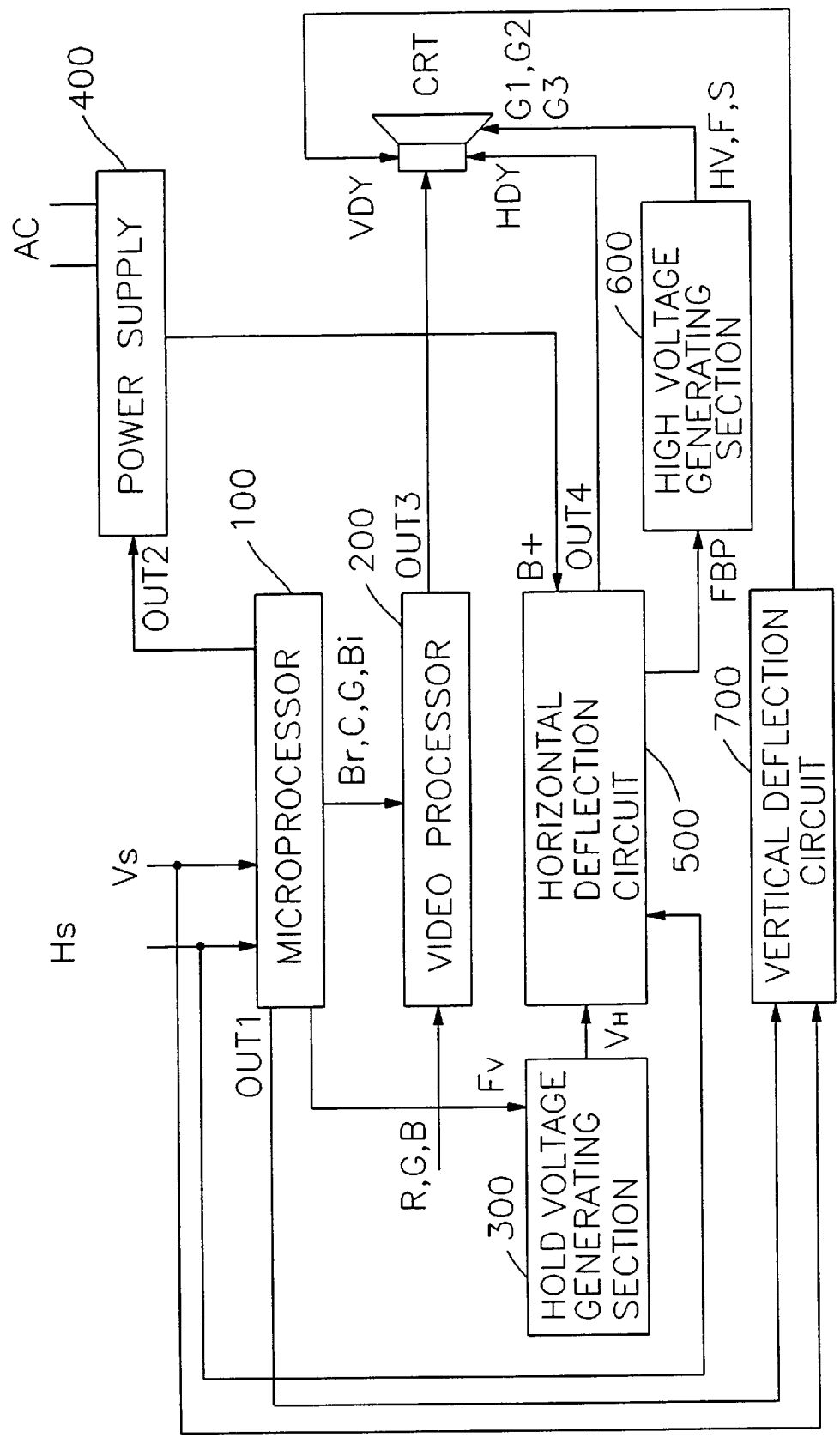
FIG. 3 is a block diagram showing the construction of a monitor according to the present invention.
Figure 4:
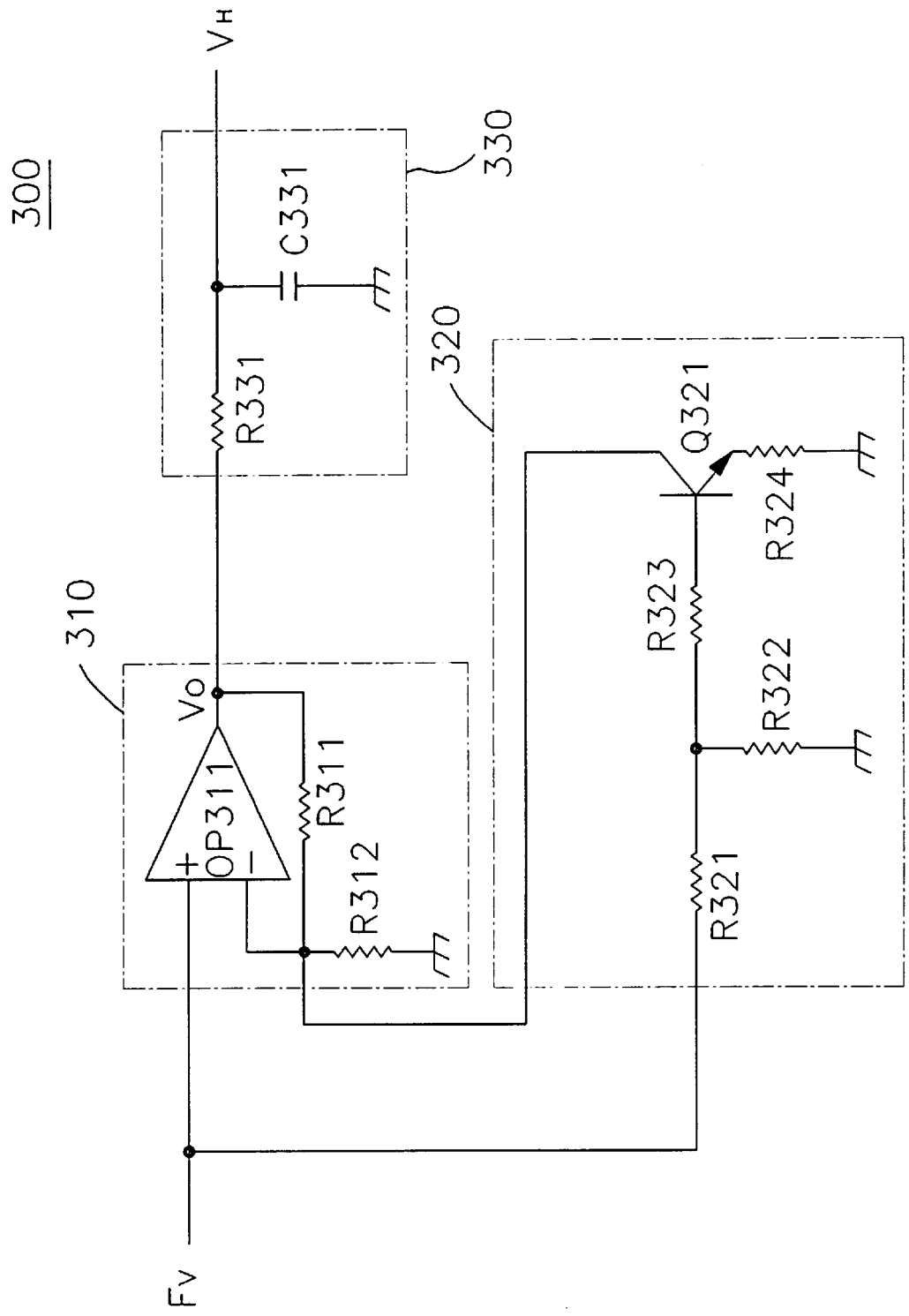
FIG. 4 is a detailed circuit diagram showing a construction of the hold voltage generating section of FIG. 3.

FIG. 3 is a block diagram showing a construction of the monitor according to the present invention, and FIG. 4 is a detailed circuit diagram showing a construction of the hold voltage generating section of FIG. 3.

Here, a microprocessor 100 receives a horizontal sync signal Hs and a vertical sync signal Vs. Microprocessor 100 produces a line mode signal OUT1, an output voltage Fv, a mode setting signal OUT2, a bright signal Br, a contrast signal C, a gain signal G and a bias signal Bi in accordance with horizontal sync signal Hs and vertical sync signal Vs. A process for constituting line mode signal OUT1, output voltage Fv, mode setting signal OUT2, bright signal Br, contrast signal C, gain signal G and bias signal Bi is identical to the aforedescribed process.

A hold voltage generating section 300 is connected to the output side of microprocessor 100. Output voltage Fv of microprocessor 100 is supplied to hold voltage generating section 300. Referring to FIG. 4 for more detailed description, the output side of microprocessor 100 is connected with an amplifying part 310 of hold voltage generating section 300 to supply output voltage Fv. The output side of microprocessor 100 is connected to a positive (+) port of an amplifier OP311 of amplifying part 310. Output voltage Fv is provided to the positive (+) port of amplifier OP311 which amplifies output voltage Fv.

The output side of amplifier OP311 is connected to the input sides of resistors R311 and R322, and the output sides of resistors R311 and R312 are grounded. The output side of resistor R311 is connected to a negative (−) port of amplifier OP311. An output voltage Vo of amplifier OP311 is divided by resistors R311 and R312, and supplied to the negative (−) port of amplifier OP311 via resistor R311.

Meantime, the output side of microprocessor 100 is connected with a voltage modifying section 320, to provide output voltage Fv to voltage modifying section 320. In more detail, the output side of microprocessor 100 is connected to the input side of a resistor 321 of voltage modifying section 320, and the output side of resistor R321 is connected to the input side of a resistor R322. Successively, the output side of resistor R322 is grounded. Output voltage Fv is received into resistor R322 via resistor R321.

The output side of resistor R321 is connected to the input side of a resistor R323, and the output side of resistor R323 is connected to the base of a transistor Q321. The emitter side of transistor Q321 is connected to the input side of resistor R324, and the output side of resistor R324 is grounded. In addition, the collector side of transistor Q321 is connected to the negative (−) port of amplifier OP311.

In other words, the division signals of resistors R321 and R322 are supplied to the base of transistor Q321 via resistor R323. By this supply, transistor Q321 is operated in an active state. An amount of current flowing from the collector side to emitter side of transistor Q321 is determined in accordance with an amount of current flowing toward the base of transistor Q321. Then, by this amount of the current, a potential difference between both ends of resistor R324 is determined. Thus, an amplifying ratio of amplifier OP311 is determined by resistances Req, R324, R311 and R312. Here, resistance Req is an equivalent resistance of transistor Q321. Therefore, output voltage Vo of amplifier OP311 satisfies the following equation:

$$Vo = \left[ 1 + \frac{R311*((Req+R324)+R312)}{(Req+R324)*R312} \right]$$

At this time, if output voltage Fv is small, a value of adding resistors Req and R324 is decreased, so that output voltage Vo is decreased.

A shaping section 330 is connected to the output side of amplifying part 310. Output voltage Vo of amplifying part 310 is provided to shaping section 330. More specifically, the output side of amplifying part 310 is connected to the input side of resistor R331 of shaping section 330. The output side of resistor R331 is connected with the input side of a capacitor C331, and the output side of capacitor C331 is grounded. Output voltage Vo of amplifying part 310 is provided to capacitor C331 via resistor R331, and capacitor C331 smooths output voltage Vo of amplifying part 310. Shaping section 330 provides hold voltage $V_H$ which is supplied to a horizontal deflection circuit 500.

Figure 1:
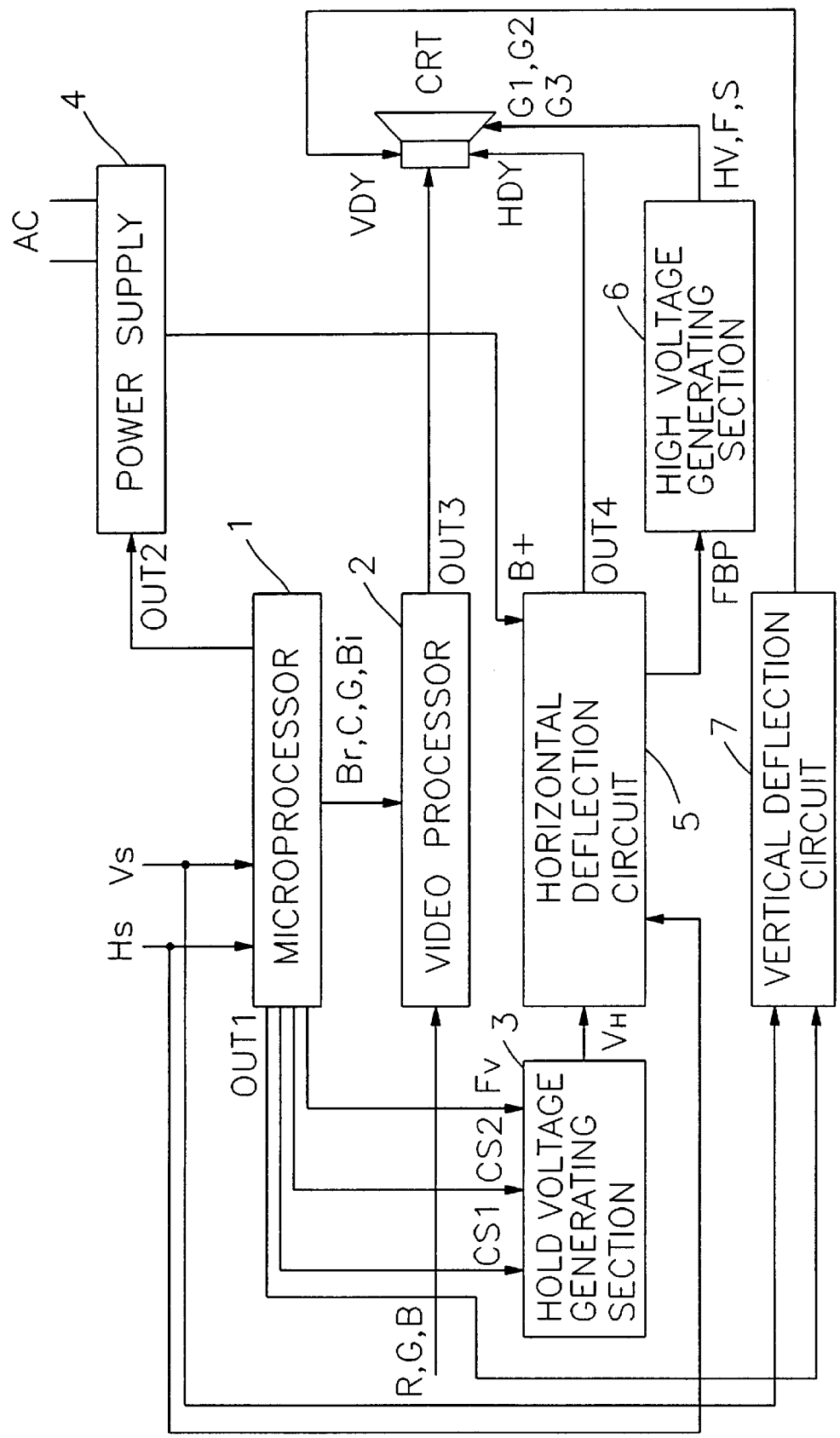
FIG. 1 is a block diagram showing a general construction of a monitor.
Figure 2:
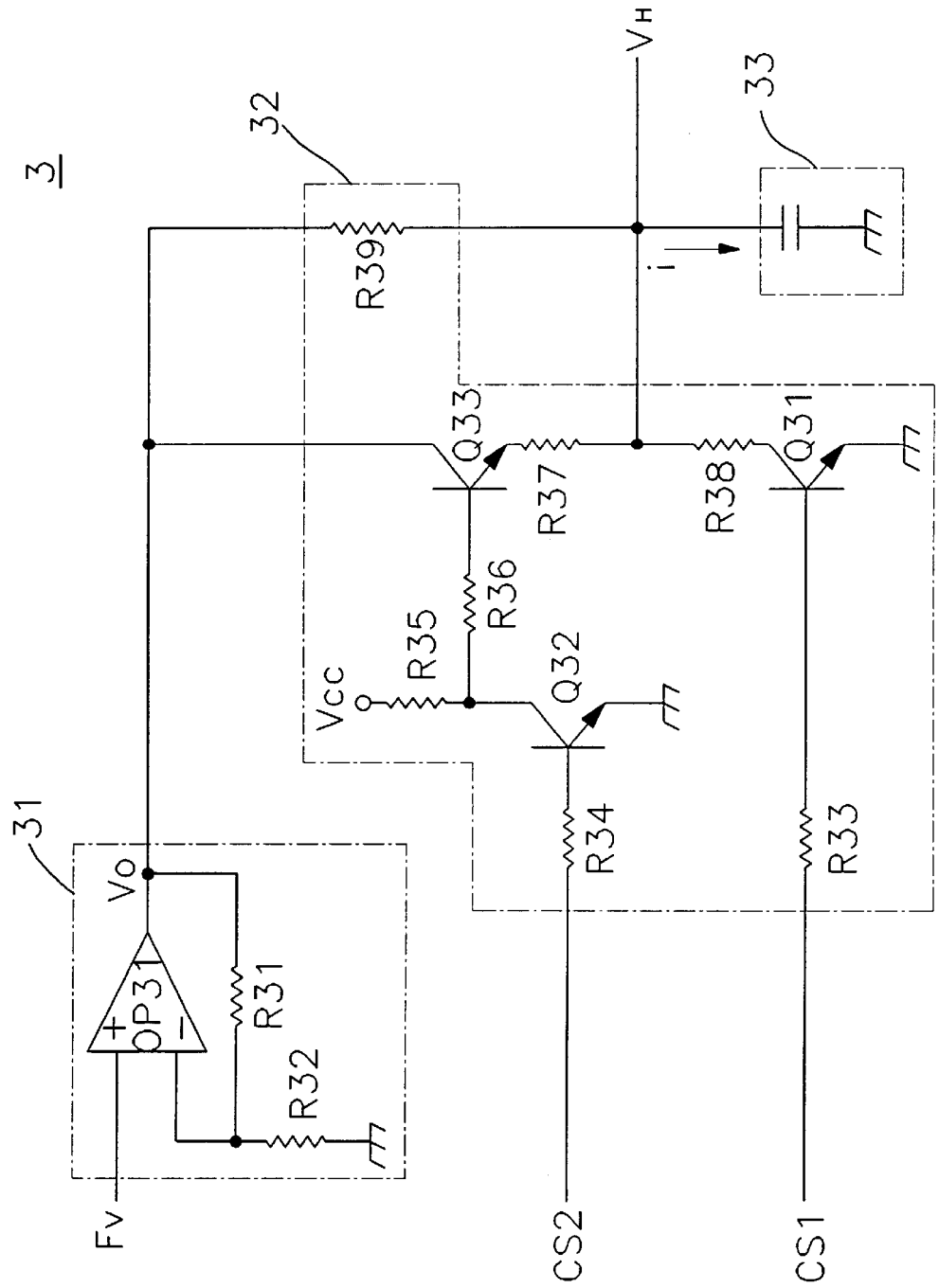
FIG. 2 is a detailed circuit diagram showing a construction of a hold voltage generating section in the conventional monitor.

A video processor 200, a power source section 400, a horizontal deflection circuit 500, a high voltage generating section 600 and a vertical deflection circuit 700 according to the present invention are identically constructed and operated to those of FIG. 1.

When the monitor according to the present invention is utilized, the hold voltage is generated in accordance with the output voltage of the microprocessor. Thus, the input port of the hold voltage generating section numbers one. Furthermore, only the output voltage is supplied via the input port thereof to prevent a malfunction of the hold voltage generating section resulting from instability of the mode signals, thereby enhancing reliability of a product. In addition, the circuit construction of the hold voltage generating section is simply designed to afford a cost effective product to a consumer.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A circuit for generating a hold voltage of a monitor comprising:

a microprocessor for producing a voltage obtained by varying a frequency of an externally-supplied horizontal sync signal;

a hold voltage generating means for generating a hold voltage in accordance with an output voltage of said microprocessor, including:
   1) an amplifying means for amplifying said output voltage of said microprocessor;
   2) a voltage modifying means for varying an amplifying ratio of said amplifying means to vary an output voltage of said amplifying means in accordance with said output voltage of said microprocessor; and
   3) a shaping means connected to an output side of said amplifying means for smoothing the output voltage of said amplifying means to output it as said hold voltage; and a horizontal deflection means for determining a frequency in accordance with said hold voltage of said hold voltage generating means and said horizontal sync signal, and generating a horizontal deflection signal of triangular waveform in accordance with the determined frequency.

2. A circuit for generating a hold voltage of a monitor as claimed in claim 1, wherein said voltage modifying means comprises:

dividing means connected to an output side of said microprocessor for dividing said output voltage; and current varying means for varying an amount of current flowing through said amplifying means in accordance with said output voltage of said dividing means in order to determine an amplifying range of said amplifying means.

3. A circuit for generating a hold voltage of a monitor as claimed in claim 1, wherein said shaping means comprises a serially-connected third resistor and capacitor connected to an output side of said amplifying means for smoothing said output voltage of said amplifying means to provide it as said hold voltage.

4. A circuit for generating a hold voltage of a monitor as claimed in claim 2, wherein said current varying means comprises:

a sixth resistor connected to an output side of said dividing means for biasing a dividing signal;

a transistor connected to an output side of said sixth resistor for operating in an active state in accordance with an output signal of said sixth resistor; and a seventh resistor connected to an emitter side of said transistor and said ground for varying said amplifying range of said amplifying means.

* * * * *